Sept. 29, 1925.
F. E. MEYER
CHILD'S VEHICLE
Filed Jan. 30, 1924
1,555,141
3 Sheets-Sheet 2
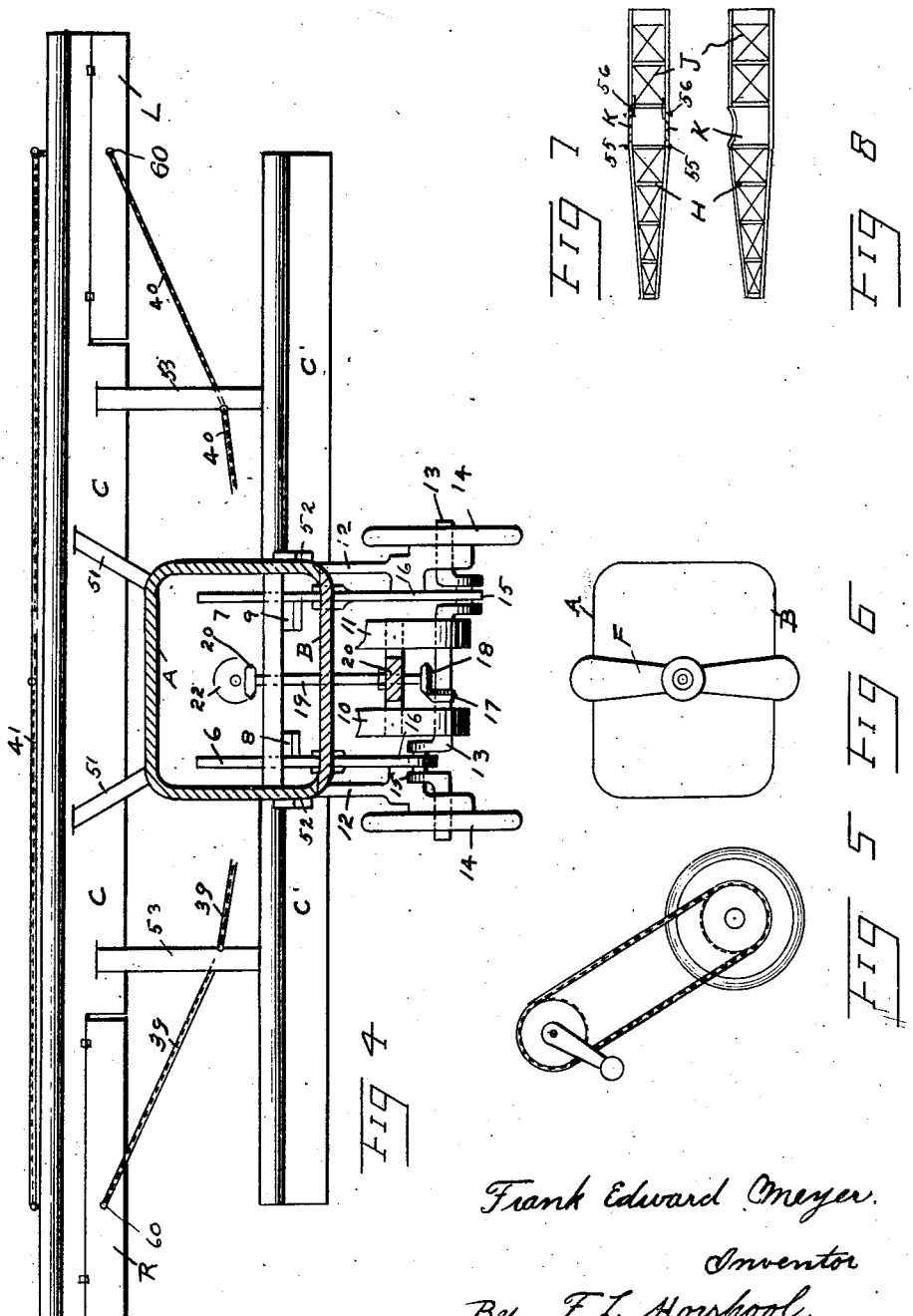
Frank Edward Meyer.
Inventor
By F. L. Horspool.
Attorney Sept. 29, 1925.
F. E. MEYER
CHILD'S VEHICLE
Filed Jan. 30, 1924
1,555,141
3 Sheets-Sheet 3
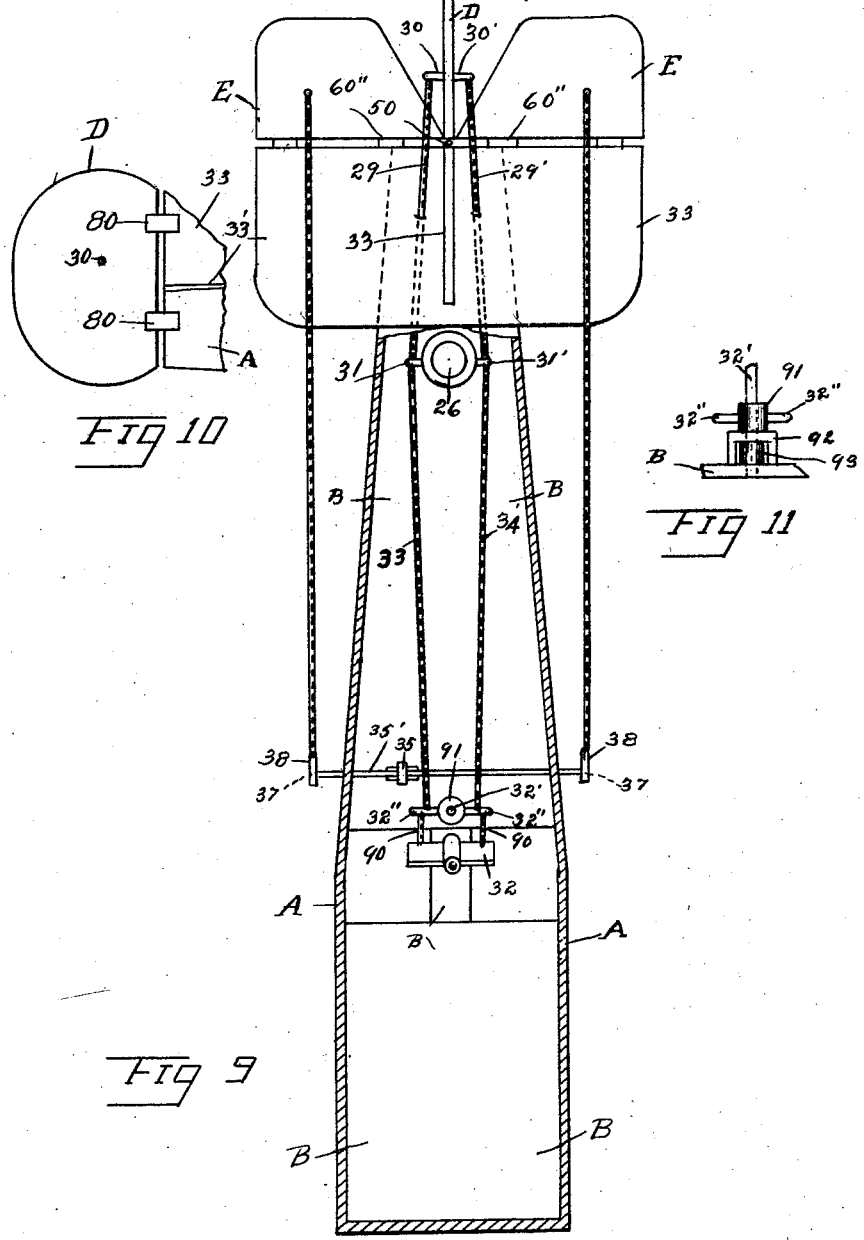

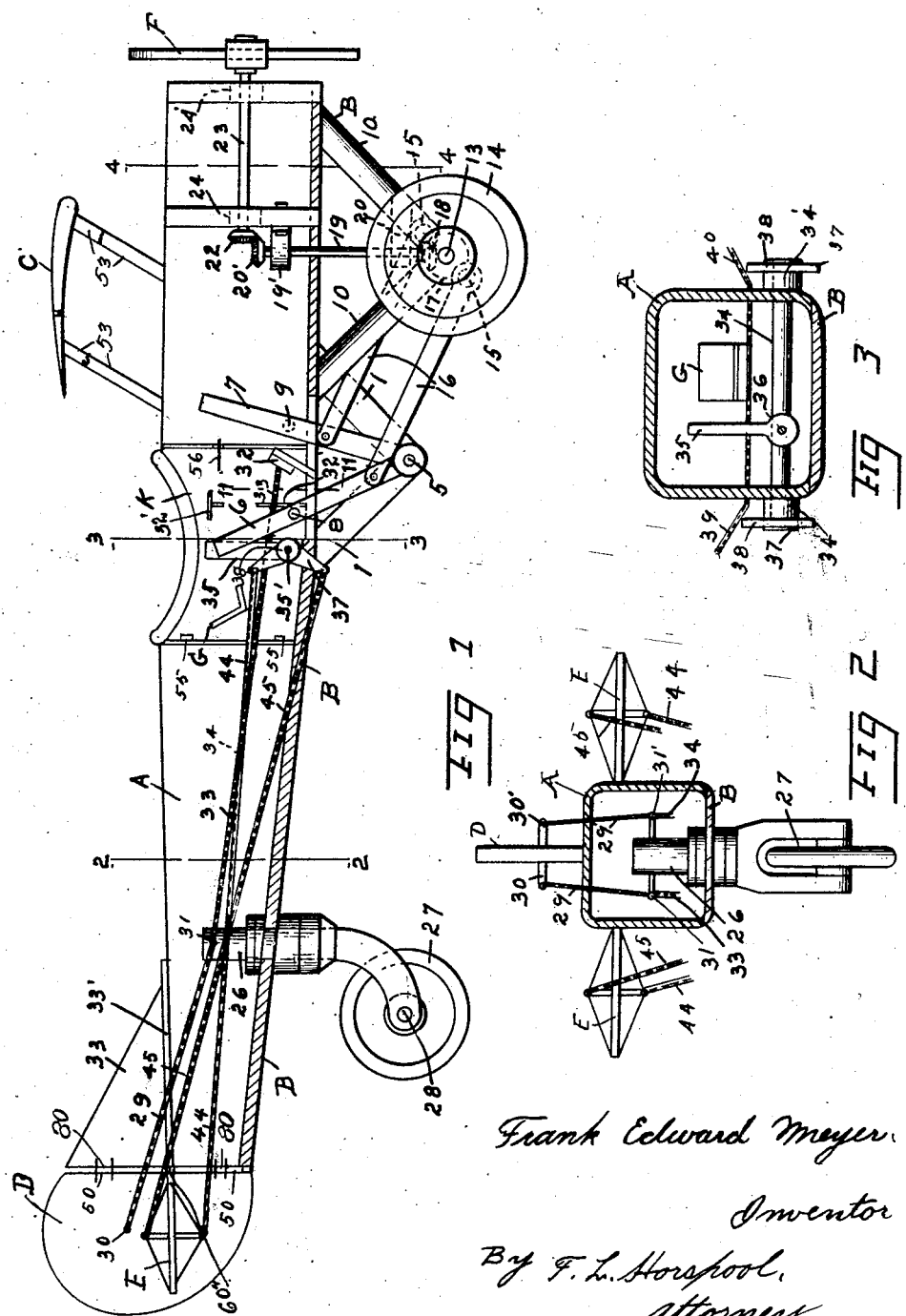

Patented Sept. 29, 1925.

1,555,141

UNITED STATES PATENT OFFICE.

FRANK EDWARD MEYER, OF SALT LAKE CITY, UTAH.

CHILD'S VEHICLE.

Application filed January 30, 1924. Serial No. 689,524.

*To all whom it may concern:*

Be it known that I, FRANK EDWARD MEYER, a citizen of the United States, residing at Salt Lake City, in the county of Salt Lake and State of Utah, have invented a new and useful Child's Vehicle, of which the following is a specification.

This invention relates to a child's vehicle, and has for one of its objects, to provide a child's vehicle with an aeroplane body, having planes, ailerons, elevators, rudder, fins and propeller, with levers for operating same.

Another object of this invention is to provide a child's vehicle having an aeroplane body mounted thereon and to be driven along the ground by hand power or by feet operating driving levers.

Another object of this invention is to provide a child's vehicle, provided with a steering wheel attached to the rudder bar cables for steering said vehicle.

While I have shown the hand drive and foot drive together in the drawings, one or the other may be omitted and any of the many designs of driving levers or steering devices now manufactured may be used.

With these and other objects in view the invention consists of the following novel construction of parts. In which;

Figure 1 is a side view of the invention showing the aeroplane body A in outline.

Fig. 2, is a section on line 2—2, Fig. 1.

Fig. 3, is a view on line 3—3, Fig. 1, the braces 1 and hand levers 6 not shown.

Fig. 4, is a view on 4—4 Fig. 1.

Fig. 5, is a view showing one style of hand power drive that can be used in place of the hand levers 6 and 7.

Fig. 6, is a front end view of the body A showing the propeller.

Fig. 7, is a plan view of the body A showing the frame work.

Fig. 8, is a side view of Fig. 7.

Fig. 9, is a plan view of the body A part in section showing the elevator and rudder with the control wires attached thereto and to the operating levers.

Fig. 10, is a fragmentary view of the vertical fin 33 and the body A showing the rudder D secured thereto by straps soldered thereto.

Fig. 11, is a fragmentary view on line 11—11 Fig. 1, showing the hand steering gear 32' and the horns 32" secured thereon by the collar 91 attached thereto.

Similar letters and numerals refer to like parts throughout the several views of the drawings.

A denotes the aeroplane body of the invention, B the floor or bottom of the aeroplane body, C and C' the planes or wings, D the rudder, E the elevators, F the propeller, R the right aileron, L the left aileron, G the seat, H the braces to the frame, J the stay wires, K the door on each side of the frame A. The door K is hinged to the frame by hinges 55 and is held closed by the catch 56 which must be operated to open or close the door. The doors K may be omitted if so desired.

Secured to the bottom B are braces 1 having bearings therein in which rests the ends of the shaft 5. Pivotally secured to the shaft 5 are vertical operating hand levers 6 and 7 which extend into the body A and in front of the seat G. Pivotally secured to the vertical operating hand levers 6 and 7 are pedals 8 and 9 for the feet movement.

Secured to the bottom of the frame B and in front of the braces 1 are another set of braces 10, 11 and 12 each having a bearing therein in which is journaled the crank shaft 13. To the crank shaft 13 is secured the wheels 14.

Within the cranks 15 of the crank shaft 13 are placed one end of the links 16 while the other end of the links are connected to the vertical operating levers 6 and 7.

Mounted on the crank shaft 13 is a split bevel gear 17 which meshes with the driven gear 18 secured to the vertical shaft 19. The vertical shaft 19 is secured to the frame by bearing 19' which is secured to the cross braces of the frame A. On the upper end of the shaft 19 is placed another bevel gear 20' which meshes with the bevel gear 22 that is secured to the propeller shaft 23. On the outer end of the propeller shaft 23 is secured the propeller F. The propeller shaft 23 is secured to the frame by bearings within the cross braces 24 and 24' of the frame.

Located on the bottom and near the back end of the frame A and swiveled thereto is a steering wheel shaft 26 having a wheel 27 secured in the lower end thereof by a pin 28. Located on the back end of the frame A and secured thereto is the vertical fin 33 and the horizontal fin 33'. Secured to the vertical fin 33 is the rudder D and is held thereto by hinges 50. The rudder D is connected to the steering wheel shaft 26 by cables 29 and 29'. These cables are connected at one end to the king posts 30 and 30' on the rudder D and the other end to the pins 31 and 31' in the upper end of the steering wheel shaft 26. The steering wheel shaft in turn is connected by cables 33 and 34 to the horns 32'' of the steering wheel 32'. And then to the rudder bar 32 by cables 90, which are an extension of the cables 33 and 34, thus when one of the means of steering are operated the other will be operated in coaction.

In Fig. 10 is shown another means of securing the rudder to the vertical fin 33, the rudder being secured thereto by straps 80 thus making the rudder stationary to the vertical fin. These straps represent a hinge in appearance but will prevent the rudder swing to and fro. In Fig. 1 the rudder is shown secured to the vertical fin by hinges 50.

To operate the rudder by the rudder bar 32, the child places its foot on one end of the rudder bar. If it be the right hand end the end will be pushed forward thus moving the rudder to the right. If it be the left hand end this end will be moved forward thus moving the rudder to the left. The movements of the rudder bar operates the steering gear 32' in coaction therewith.

To operate the rudder by the steering wheel 32' the child turns the wheel to the right to move rudder to the right and turns wheel to the left to move rudder to the left, these movements also operates the rudder bar 32 in coaction therewith.

Secured to the body A are the planes C and C'. Located in the planes C are the right aileron R and the left aileron L.

Plane C is secured to the body A by braces 51. Planes C' are secured to the body at 52 by straps 81. One end of the straps 81 being secured to the frame and the other end thereof being secured to the end of said plane C'. The planes C and C' are secured together by braces 53.

Located on top of the body A and at the back end thereof is the horizontal fin 33' to which is secured by means of hinges 60'' the elevators E.

Placed within the body A and pivoted on the shaft 35' is the joy stick or control lever 35. The shaft 34 is secured to the insides of the body by bearings 34' which are secured to the sides of the frame A. The ends of the shaft 34 are journaled in the bearings 34' and pass on through and project out past said bearings. To the ends of the shaft 34 are secured the elevator horns 37 and 38 to which are connected one end of the elevator control wires 44 and 45. These operating wires work in same manner as the elevator control wires do on the flying aeroplane. Thus by moving the control lever 35 forward it lowers the elevators and by moving it backward it raises the elevators.

Secured to the sides of the control lever 35 are the wires 39 and 40 which extend out of the sides of the body A and run through pulleys to the bottom king post 60 of the ailerons. On the top of the plane C and connected to the king post of the ailerons is the balance wire 41. The control lever and wires may be omitted in the construction of the vehicle if so desired.

The ailerons are operated by moving the control lever to the right or left.

In the drawings Fig 5, shows a hand driven tractor to be used in place of the hand lever attachment where foot power is not desired.

Having thus described the parts of the invention, the operation of same will now be explained.

When the child wishes to enter the body when the door is not used, it steps over the side and climbs into the cock pit in the same manner as they do in getting into a box.

Where the door is used; when the child wishes to enter the body A, the door K is opened and after the child has entered and been seated the door K is then closed. When the doors K are closed they form a cock pit for the child to sit in. The doors K are held closed by catches 56. The child after entering the body to operate the car takes hold of the vertical operating levers 6 and 7 then places the feet on the pedals 8 and 9 and by moving the arms and feet forward and backward operates the mechanism to move the vehicle and in steering the foot is removed from one of the pedals and placed on the rudder bar to turn the steering wheel in the direction desired.

Having thus described the invention what is claimed and desired to be secured by Letters Patent, is;

1. A vehicle in combination with an aeroplane frame having wings secured thereto and a seat therein, operating levers pivoted to a shaft supported by braces secured to said frame and located above said braces in front of said seat and adapted to be operated by the child's hands and feet, link members operated by said operating levers, said link members connecting said operating levers with a crank shaft of the front wheels and means for securing said wheels to said shaft.

2. A child's vehicle comprising an aeroplane body having wings secured thereto, a seat for the child carried within said body, said body having braces secured to the bottom thereof, operating levers pivoted to a shaft supported by said braces, said operating levers projecting upward from said braces and in front of said seat and adapted to be operated by the child's hands and feet, link members secured to said operating levers, said link members connecting said operating levers with a crank shaft, and means for securing wheels to said crank shaft.

3. A vehicle aeroplane mounted on wheels, the combination with wings, a driving mechanism thereof comprising a pair of pivoted members connected by links with the cranks on the axle of the front wheels, said operating levers being provided with hand levers and foot holds whereby the child may use simultaneously the power of both hands and feet.

4. A vehicle in combination with an aeroplane frame a pair of wings secured thereto, a seat for the operator carried within said frame, a pair of pivoted driving levers carried by said frame in front of the operator and adapted to be operated by the hands or feet, a crank shaft carried by said frame, links connecting said driving levers with said crank shaft, a propeller on said vehicle driven from said crank shaft and means for steering said vehicle.

5. In a vehicle of aeroplane construction and design having an aeroplane body, and fins, and a cock pit within said body having a seat therein, means to enable the getting in and out of said cock pit, an operating lever within said cock pit, said operating lever pivoted on a shaft, the ends of said shaft resting in bearings secured to said body, said shaft having horns secured to the ends thereof, cables attached to said horns for operating the elevators, cables attached to said lever for operating the ailerons and means for propelling said vehicle.

6. A child's vehicle having an aeroplane body, and a cock pit within said body, means to enable the getting in and out of said cock pit, a seat within said cock pit, a control lever within said cock pit, said control lever pivoted to a shaft, the ends of said shaft resting in bearings secured to the sides of said body, the ends of said shaft having horns secured thereto, wires attached to said horns for operating the elevators, cables attached to said control lever for operating the ailerons, means for propelling said vehicle and means for steering same.

7. A child's vehicle in construction having an aeroplane frame, rudder, attached thereto, a cock pit within said frame, said frame having a bottom thereon, a steering wheel swiveled to and near the rear end of said bottom, means for operating said steering wheel, separate operating levers, a crank shaft supported in bearings secured to the front end of said bottom, said crank shaft having cranks therein, each crank having links attached thereto, said links connecting said crank with said operating levers.

8. A child's vehicle of aeroplane construction and design comprising the aeroplane body frame, rudder, a cock pit within said frame, door means to enable the getting in and out of said cock pit, said cock pit having a seat therein, operating levers within said cock pit, the lower end of said operating levers being pivoted to a shaft supported in bearings secured to the bottom of said body frame, wheels secured to a crank shaft journaled in another set of bearings secured to the bottom of said body frame and near the front end thereof, links connecting said operating levers with said crank shaft, a vertical shaft, said vertical shaft having a bevel gear secured to the lower end thereof and meshing with a bevel gear on said crank shaft, another bevel gear mounted on the upper end of said vertical shaft, means for securing said vertical shaft to the body frame, a horizontal shaft journaled in bearings secured to cross braces of said body frame, said horizontal shaft having a bevel gear secured thereon and meshing with the bevel gear on the upper end of said vertical shaft, a propeller secured to the outer end of said horizontal shaft, said bevel gears and vertical shaft and horizontal shaft to operate said propeller from power from said crank shaft when said vehicle is propelled and moving, another shaft for operating said ailerons and elevators, and means for steering said vehicle.

9. In an amusement vehicle for children in combination with an aeroplane body frame having a floor therein, a steering wheel swiveled on a shaft near the back end of said floor, an operating foot lever secured to said floor within said frame, said foot lever having cables attached thereto and the other end of said cables are attached to said steering wheel shaft, a rudder, said steering wheel shaft having cables extending therefrom and connecting to said rudder, said foot lever and cables for operating said steering wheel and rudder, vertical operating levers, the front portion of said floor having braces projecting therefrom, a crank shaft journaled within bearings in said braces, said crank shaft having a bevel gear mounted thereon, links connecting the cranks in said crank shaft with said vertical operating levers, said crank shaft having wheels secured thereon, said vertical operating levers for operating said links and crank shaft, means for securing said vertical operating levers to said body frame, a propeller mounted on said body frame and means for operating said propeller from said crank shaft.

In witness whereof I affix my signature.

FRANK EDWARD MEYER.